US00RE42427E

(19) United States
(12) Reissued Patent
Yamakawa et al.

(10) Patent Number: US RE42,427 E
(45) Date of Reissued Patent: Jun. 7, 2011

(54) THERMAL TRANSFER RECORDING WEB ROLL

(75) Inventors: Noboru Yamakawa, Tokyo-to (JP); Hitoshi Saito, Tokyo-to (JP); Hisaki Ota, Tokyo-to (JP); Hiroaki Inoue, Tokyo-to (JP); Junichi Hiroi, Tokyo-to (JP); Tatsuya Kita, Tokyo-to (JP); Shinichiro Takeda, Tokyo-to (JP); Hiroshi Sugita, Tokyo-to (JP)

(73) Assignee: Dai Nippon Printing Co., Ltd., Shinjuku-Ku (JP)

(21) Appl. No.: 11/728,981

(22) Filed: Mar. 27, 2007

Related U.S. Patent Documents

Reissue of:
(64) Patent No.: 6,894,711
Issued: May 17, 2005
Appl. No.: 10/464,861
Filed: Jun. 19, 2003

(30) Foreign Application Priority Data

Jun. 21, 2002 (JP) ..... 2002-181961

(51) Int. Cl.
*B41J 15/02* (2006.01)
*B65H 75/28* (2006.01)
*B65H 75/30* (2006.01)

(52) U.S. Cl. ..... 347/221

(58) Field of Classification Search ..... 347/221
See application file for complete search history.

(56) References Cited

U.S. PATENT DOCUMENTS

| | | | | |
|---|---|---|---|---|
| 4,297,403 | A | 10/1981 | Smith | |
| 5,086,987 | A | 2/1992 | Shieh | |
| 5,106,123 | A | 4/1992 | Shieh | |
| 5,152,625 | A * | 10/1992 | Machii | 400/711 |
| 5,763,356 | A | 6/1998 | Ueno et al. | |
| 6,478,229 | B1 | 11/2002 | Epstein | |
| 6,580,446 | B2 | 6/2003 | Yamakawa et al. | |
| 2002/0075375 | A1 | 6/2002 | Yamakawa et al. | |
| 2003/0025027 | A1 | 2/2003 | Ebisawa et al. | |
| 2003/0112320 | A1 | 6/2003 | Yamakawa et al. | |

FOREIGN PATENT DOCUMENTS

| | | | |
|---|---|---|---|
| EP | 0 405 363 | A2 | 1/1991 |
| EP | 405363 | * | 1/1991 |

(Continued)

OTHER PUBLICATIONS

Computer-generated translation of JP 2001-261203, published on Sep. 26, 2001.*
Computer-generated translation of JP 2001-139192, published on May 22, 2001.*

(Continued)

*Primary Examiner* — Huan H Tran
(74) *Attorney, Agent, or Firm* — Burr & Brown

(57) ABSTRACT

A coreless thermal transfer recording web roll 10 is formed by rolling a thermal transfer recording web 10a in a roll. An inner end part 11 of the thermal transfer recording web 10a of the thermal transfer recording web roll 10 has a tab 11a formed at a substantially middle of the inner end part 11, and sticking parts 11b formed on the opposite sides of the tab 11a, respectively. Pseudoadhesive double-coated tapes 14 are attached to the sticking parts 11b, respectively. The pseudoadhesive double-coated tapes become tack-free after the sticking parts 11b have been separated from the innermost layer of the thermal transfer recording web 10a of the thermal transfer recording web roll 10.

25 Claims, 8 Drawing Sheets

FOREIGN PATENT DOCUMENTS

| | | | |
|---|---|---|---|
| JP | 2001-139192 | A | 5/2001 |
| JP | 2001-139192 | A1 | 5/2001 |
| JP | 2001-261203 | A | 9/2001 |
| JP | 2001-261203 | A1 | 9/2001 |

OTHER PUBLICATIONS

Machine-generated translation of JP 2001-139192, published on May 22, 2001.*

* cited by examiner

THERMAL TRANSFER RECORDING WEB ROLL

Matter enclosed in heavy brackets [ ] appears in the original patent but forms no part of this reissue specification; matter printed in italics indicates the additions made by reissue.

TECHNICAL FIELD

The present invention relates to a thermal transfer recording web roll to be used on a thermal transfer printer.

BACKGROUND ART

There are a variety of thermal transfer methods using thermal transfer sheets made by forming color transfer layers on base sheets. The color transfer layers of the thermal transfer sheets are heated from behind the thermal transfer sheets with a thermal head or the like in patterns for yellow, magenta and cyan images of characters, figures or patterns, respectively, and the patterned yellow, magenta and cyan layers are transferred to the surface of a transfer recording medium. Thermal transfer methods are classified roughly by the type of the color transfer layers into those of the sublimation transfer system and those of the melt transfer system. The thermal transfer method of the sublimation transfer system uses thermal transfer sheets made by forming color transfer layers each of a binder containing a dye that sublimates or shifts when heated on base sheets, heats the thermal transfer sheets from behind to make the dyes contained in the color transfer layers transfer from the thermal transfer sheets to a recording medium. The surface of the recording medium is coated with a recording layer that can easily be dyed.

The thermal transfer method of the melt transfer system uses thermal transfer sheets made by forming color transfer layers that soften, melt and become transferable when heated on base sheets, heats the thermal transfer sheets from behind to transfer the color transfer layers to the surface of a recording medium. Both the thermal transfer methods of the sublimation transfer system and those of the melt transfer system are capable of forming monochromatic images and multicolor images. In forming a multicolor image, the thermal transfer method uses three or four color thermal transfer sheets for, for example, yellow, magenta and cyan images or, when necessary, yellow, magenta, cyan and black images, and thermally transfers the color images of those colors to a recording medium to form color images.

The thermal transfer method holds a plurality of thermal transfer recording sheets in a stack and feeds the thermal transfer recording sheets to a printer or uses a thermal transfer recording web roll and feeds the thermal transfer recording web to a printer.

Recently, the thermal transfer method is used for the thermal transfer recording of a large amount of prints, and thermal transfer recording web rolls are used. The thermal transfer recording web roll, in general, is formed by winding a thermal transfer recording web around a feed core (bobbin). The leading edge of the recording web wound around the feed core is attached adhesively to a take-up core and is taken upon the take-up core after the completion of thermal transfer recording or the recording web is cut in a sheet after the completion of thermal transfer recording and the printed recording sheet is delivered.

The aforesaid conventional thermal transfer recording web roll has the following problems.

(1) The conventional thermal transfer recording web roll needs a feed core formed in a high dimensional accuracy to roll the thermal transfer recording web uniformly around the feed core without creasing the thermal transfer recording web. Thus, the feed core is inevitably costly.

A feed core of a reduced cost may be a paper tube formed mainly of paper pulp instead of a plastic material. The paper tube is brought into contact with a driving member of a printer to rotate the thermal transfer recording web roll on the printer. Paper powder is produced due to the abrasion of the paper tube by the driving member in rotating the thermal transfer recording web roll, the paper powder scatters in the printer and, consequently, pinholes are formed in prints formed by thermal transfer printing deteriorating image quality.

(2) The core is mere waste after the thermal transfer recording web held thereon has been used up. Since the cylindrical core is bulky for its weight, the core cannot efficiently be carried for waste disposal. The core is not recycled and thrown away, which is against demand for waste reduction to avoid environmental problems.

(3) It takes time and requires troublesome work to store cores, to set a core on a take-up machine for taking up a thermal transfer recording web and to wind a thermal transfer recording web around the core.

(4) An end part of a thermal transfer recording web cannot correctly attached to a desired part of a core in attaching the end part to the core with an adhesive tape, an adhesive double-coated tape or a paste. The thermal transfer recording web meanders while the same is being wound round the core and, consequently, the width of a thermal transfer recording web roll formed on the core is somewhat greater than that of the thermal transfer recording web. Since the thermal transfer recording web is wound under a specified tension and a specified pressure around a hard, cylindrical core, the position of the thermal transfer recording web roll formed on the core cannot be adjusted relative to the core. Therefore, the core must have a length greater than the width of the thermal transfer sheet taking into consideration the attachment of the end part of the thermal transfer recording web to an incorrect part of the core, and the formation of a thermal transfer recording web roll having a width greater than the width of the thermal transfer recording web. Thus, the thermal transfer recording web roll formed by winding a thermal transfer recording web around a core is inevitably large.

Sometimes, the thermal transfer recording web roll is deformed when shocks act on the thermal transfer recording web roll when the thermal transfer recording web roll is dropped or handled improperly in carrying the thermal transfer recording web roll or loading the thermal transfer recording web roll into a printer. It is difficult to straighten the deformed, hard thermal transfer recording web roll.

The incorrect winding of the thermal transfer recording web around the core and the deformation of the thermal transfer recording web roll while the thermal transfer recording web roll is handled affect adversely to the accuracy of print position on the thermal transfer recording web.

(5) Flaws corresponding to steps including an end part of the thermal transfer recording web attached to the core and an end detection hole formed in the thermal transfer recording web are formed in the thermal transfer recording web roll due to pressure and tension that act on the thermal transfer recording web, and the flaws become apparent in different densities of prints. FIG. 10 is a view of assistance in explaining the formation of flaws in a thermal transfer recording web 10a. In FIG. 10 flaws 3 due to an end indicating hole 2 and an end part of the thermal transfer recording web attached to a core 1. Sometimes, the hardness of the thermal transfer recording web roll is reduced by adjusting winding tension and winding pressure to prevent the foregoing problem due to the adverse effect of the end part of the thermal transfer recording web attached to the core and the end detecting hole on prints, which, however, could not achieve a desired effect.

DISCLOSURE OF THE INVENTION

It is an object of the present invention to provide a thermal transfer recording web roll to be used on a thermal transfer printer, capable of being produced at a low cost without requiring much time and labor and of producing prints having a high print quality by thermal transfer printing.

According to the present invention, a thermal transfer recording web roll for use on a printer, formed by winding a thermal transfer recording web having a base web, and a recording layer formed on one of the surfaces of the base web; wherein the thermal transfer recording web is wound in a substantially cylindrical shape, a sticking part sticking to an innermost layer of the thermal transfer recording web is formed in an inner end part of the thermal transfer recording web, and the outer surface of the inner end part of the thermal transfer recording web is held by the inner surface of the innermost layer of the thermal transfer recording web through the sticking part.

The thermal transfer recording web roll according to the present invention for use on a printer, the sticking part may become tack-free after the outer surface of the inner end part of the thermal transfer recording web is separated from the inner surface of the innermost layer of the thermal transfer recording web.

The thermal transfer recording web roll according to the present invention for use on a printer, the sticking parts may have a pseudoadhesive property that enables the sticking parts to be separated from the innermost layer of the thermal transfer recording web by a peeling force not higher than a peeling force corresponding to a take-up torque exerted by the printer.

The thermal transfer recording web roll according to the present invention for use on a printer, the sticking part may include pseudoadhesive a double-coated tape.

The thermal transfer recording web roll according to the present invention for use on a printer, the inner end part of the thermal transfer recording web may be provided with a tab for winding.

The thermal transfer recording web roll according to the present invention for use on a printer, the inner end part of the thermal transfer recording web may have the tab formed in a middle part thereof with respect to the width, and a pair of sticking parts respectively on the opposite sides of the tab.

The thermal transfer recording web roll according to the present invention, the tab and the sticking parts may be demarcated by slits, respectively.

The thermal transfer recording web roll according to the present invention, the tab may project in a winding direction of the thermal transfer recording web relative to the sticking parts.

The thermal transfer recording web roll according to the present invention, the tab may have a rectangular projection projecting from a middle part of the inner end of the thermal transfer recording web.

The thermal transfer recording web roll according to the present invention, the tab may have a triangular projection projecting from a middle part of the inner end of the thermal transfer recording web.

The thermal transfer recording web roll according to the present invention, an adhesive layer may be formed on the other surface of the base web, and a release tape is applied to the adhesive layer.

The thermal transfer recording web roll according to the present invention, a noncontact IC tag may be attached to a part of the thermal transfer recording web near the inner end part of the thermal transfer recording web.

The thermal transfer recording web roll according to the present invention, adhesive strength of the sticking part between the innermost layer of the thermal transfer recording web and the inner end part of the thermal transfer recording web is higher than a peeling force corresponding to a take-up torque exerted by the printer.

BEST MODE FOR CARRYING OUT THE INVENTION

Figure 1:
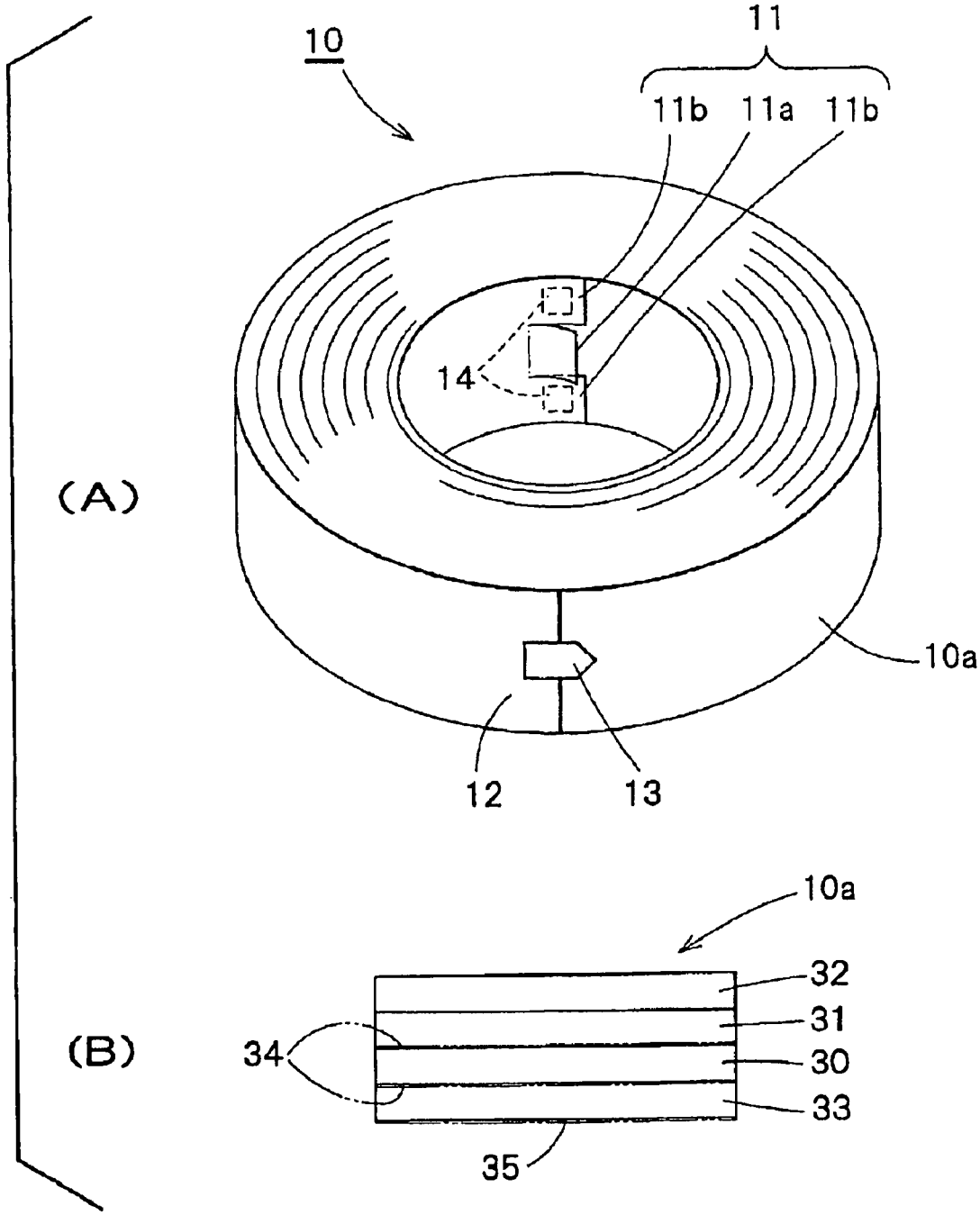
FIG. 1 is a perspective view of a thermal transfer recording web roll in a first embodiment according to the present invention in an unused state.

Preferred embodiments of the present invention will be described with reference to the accompanying drawings.

First Embodiment

FIG. 1(A) shows an unused thermal transfer recording web roll in a first embodiment according to the present invention, and FIG. 1(B) is a sectional view of a thermal transfer recording web 10a.

A thermal transfer recording web roll 10 in the first embodiment is formed by rolling the thermal transfer recording web 10a, and has an inner end part 11, an outer end part 12 and a fastening tape 13.

As shown in FIG. 1(B), the thermal transfer recording web 10a has a base web 30, an intermediate layer 31 formed on one of the surfaces of the base web 30, and a recording layer 32 formed on a surface of the intermediate layer 31.

Base Web

Preferably, the base web 30 has a mechanical strength sufficient for preventing troubles in handling because the base web 30 holds the recording layer 32 thereon and is heated in transferring an image thereto by thermal transfer. There are not any particular restrictions on the material forming the base web 30. The base web 30 may be formed of cellulose paper, such as condenser paper, glassine paper, parchment paper, paper having a high degree of sizing, synthetic paper (polyolefin paper and polystyrene paper), wood-free paper, art paper, cast coated paper, wallpaper, lining paper, paper impregnated with a synthetic resin of an emulsion, paper impregnated with synthetic rubber latex, cardboard, may be formed of a film of one of polyester resins, polyacrylate resins, polycarbonate resins, polyurethane resins, polyimide resins, polyether imide resins, cellulose derivatives, polyethylene resins, ethylene-vinyl acetate copolymers, polypropylene resins, polystyrene resins, acrylic resins, polyvinyl chloride resins, polyvinylidene chloride resins, polyvinyl alcohol resins, polyvinyl butyral resins, nylons, polyether ether ketone resins, polysulfone resins, polyether sulfone resins, tetrafluoroethylene perfluoroalkylvinyl ether resins, polyvinyl fluoride resins, tetrafluoroethylene ethylene resins, tetrafluoroethylene hexafluoropropylene resins, polychlorotrifluoroethylene resins, and polyvinylidene fluoride resins. The base web 30 may be a white, opaque film of a material prepared by mixing one of the foregoing synthetic resins and a white pigment or filler or may be a foam web.

The base web 30 may be a laminate formed by laminating webs of the foregoing materials. A typical laminate may be a synthetic paper sheet formed by laminating a cellulose paper sheet and a synthetic paper sheet, or a synthetic paper sheet formed by laminating a cellulose paper sheet and a plastic film. The thickness of the base web 30 is optional. Usually, the thickness of the base web 30 is in the range of about 10 to about 300 μm. If the adhesion between the base web 30 and the intermediate layer 31 is insufficient, it is preferable to coat the surface of the base web 30 with a primer to finish the surface of the base web 30 by a corona discharge treatment.

Intermediate Layer

The intermediate layer 31 is formed on the base web 30 mainly for coloring the recording surface and opacification to conceal the base web 30. A material forming the intermediate layer 31 contains two or more kinds of dyes, a white pigment, necessary additives and a resin as a binder. Resins suitable for forming the intermediate layer 31 are, for example, thermoplastic resins, such as polyurethane resins, acrylic resins, polyester resins and polycarbonate resins, and thermosetting resins, such as resins obtained through the partial crosslinking of the aforesaid resins, crosslinked polyurethane resins, epoxy resins, melamine resins and urea resins.

The white pigment may be an inorganic pigment, such as titanium oxide, zinc oxide, barium sulfate or alumina white, an extender pigment, such as kaolin clay, silica, magnesium carbonate or calcium carbonate, or a mixture of some of those pigments.

The intermediate layer 31 is formed by an intermediate layer forming method including the steps of preparing a coating liquid by dissolving or dispersing the aforesaid resin, at least two kinds of dyes, a white pigment and, when necessary, additives in a suitable organic solvent, such as ethyl acetate, methyl ethyl ketone, toluene, xylene or cyclohexanone, coating at least one of the surfaces of the base web 30 with a coating layer of the coating liquid by a coating means, such as a gravure coating process, a screen printing process or a reverse-roll coating process using a gravure plate, drying the coating layer and, when necessary, subjecting the coating layer to a crosslinking process. The intermediate layer 31 thus formed has a solid basis weight in the range of about 0.5 to 10 $g/m^2$, more preferably, in the range of 1 to 6 $g/m^2$. An excessively thin intermediate layer is unable to exhibit a desired effect. The effect of an intermediate layer does not enhance beyond a certain level even if the thickness thereof is increased excessively, and an excessively thick intermediate layer reduces print sensitivity.

Recording Layer

The recording layer 32 formed on the intermediate layer 31 formed on the base web 30 receives when heated a dye transferred from a thermal transfer sheet and records an image formed thereon. Materials suitable for forming the recording layer 32 are polyolefin resins, such as polypropylene resins, halogenated polymers, such as polyvinyl chloride resins and polyvinylidene chloride resins, vinyl resins, such as polyvinyl acetate resins, ethylene-vinyl acetate copolymers, vinyl chloride-acetate copolymers and polyacrylate resins, acetal resins, such as polyvinyl formal resins, polyvinyl butyral resins and polyvinyl acetal resins, saturated and unsaturated polyester resins, polycarbonate resins, cellulose resins, such as cellulose acetate resins, styrene resins, such as polystyrene resins, acryl-styrene copolymers and acrylonitril-styrene copolymers, urea resins, melamine resins, and polyamide resins, such as benzoguanamine resins. The recording layer 32 may be formed of a compatible blend of some of the foregoing resins.

When the binder contained in the intermediate layer 31 is a resin having active hydrogen in hydroxyl groups or carboxyl groups, addition of a curing agent that react with active hydrogen in the recording layer 32 enhances the adhesion between the intermediate layer 31 and the recording layer 32. Preferable curing agents for such a purpose are isocyanate compounds, amino compounds, and organometallic compounds. Catalysts respectively suitable for use in combination with those curing agents may be used to increase the reaction rates of the curing agent. It is preferable that the least necessary amount of curing agent is added to the material forming the recording layer 32 in order to adhere to the intermediate layer 31.

In some cases, the resin contained in the recording layer 32 fuses with a dye binder holding a dye during the thermal transfer image recording. Therefore, it is preferable that the recording layer 32 contains a lubricant, such as a phosphate, a surface-active agent, a fluorine compound, a fluorine resin, a silicon compound, a silicone oil or a silicone resin, to provide the recording layer 32 with a satisfactory release characteristic. It is particularly preferable to add a modified silicone oil to and to cure the recording layer 32. Although the lubricant content is dependent on the type of the lubricant, it is preferable that the lubricant content is the least possible value that is sufficient for the lubricant to satisfactorily exercise its effect in the range of 1 to 20 parts by weight on the solid bases. When a modified silicone oil having reactive groups capable of reacting with the curing agent is added to the recording layer 32, it is preferable that the ratio of the equivalent weight of the reactive groups of the modified silicone oil to that of the reactive groups of the curing agent is in the range of 1:1 to 1:10. A releasing layer, i.e., a layer of the aforesaid lubricant or a layer of a mixture of the binder and the aforesaid lubricant, may be formed on the recording layer instead of adding the lubricant to the recording layer.

The recording layer 32 is formed by applying a coating liquid prepared by dissolving or dispersing a mixture of a resin and necessary additives in an organic solvent to the intermediate layer 31 by a coating process, such as a gravure printing process, a screen printing process or a reverse-roll coating process using a gravure plate, in a coating layer and drying the coating layer. Although the recording layer may have any thickness, the thickness of the recording layer, in general, is in the range of 1 to 50 μm.

Slip Layer

A slip layer 33 may be formed on the back surface of the base web 30 of the thermal transfer recording web 10a to improve the facility of mechanical carrying of the thermal transfer recording web 10a and to prevent the curling of the thermal transfer recording web 10a. It is preferable to add a proper amount of an organic or inorganic filler to the binder or to use a resin having a high lubricity, such as a polyolefin resin or a cellulose resin, as the binder. The slip layer 33 may be formed of a mixture prepared by adding as additives, an organic filler, such as an acrylic filler, a nylon filler, a Teflon® filler or a polyethylene wax, and an inorganic filler, such as silicon dioxide or a metal oxide, to a resin, such as an acrylic resin, a cellulose resin, a polycarbonate resin, a polyvinyl acetal resin, a polyvinyl alcohol resin, a polyamide resin, a polystyrene resin, a polyester resin or a halogenated polymer. An acrylic resin is preferable and an acrylpolyol is most preferable. It is preferable to use a resin obtained by curing an acrylpolyol with a curing agent.

The slip layer 33 is formed by applying a coating liquid prepared by thoroughly kneading a mixture prepared by mixing the aforesaid resin, a filler, a solvent and a diluent to the back surface of the base web 30 by a coating process, such as a gravure printing process, a screen printing process or a reverse-roll coating process using a gravure plate, in a coating layer and drying the coating layer. Although the slip layer 33 may have any thickness, the thickness of the slip layer 33, in general, is in the range of 1 to 10 μm Adhesive Layer An adhesive layer 34 of an adhesive resin, such as an acrylate resin, a polyurethane resin or a polyester resin, may be formed on the surface and/or the back surface of the base web 30. The adhesive layer 34 is formed by applying a coating liquid containing the aforesaid resin to the surface and/or the back surface of the base web 30 by a coating process, such as a gravure printing process, a screen printing process or a reverse-roll coating process using a gravure plate, in a coating layer and drying the coating layer. The surface and/or the back surface of the base web 30 may be processed by a corona discharge process instead of coating the surface and/or the back surface of the base web 30 with the coating layer to enhance adhesion between the base web 30 and the layer formed on the former.

Antistatic Layer

An antistatic layer 35 may be formed on at least one of the outermost surfaces of the thermal transfer recording web 10a. The antistatic layer 35 is formed by spreading a coating liquid prepared by dissolving or dispersing a fatty ester, a sulfate, a phosphate, an amide, a quaternary ammonium salt, betaine, an amino acid or an ethylene oxide addition product in a solvent. The antistatic layer 35 may be formed by spreading a conductive resin produced by introducing a group having an antistatic effect, such as a quaternary ammonium salt, a phosphate, an ethosulfate, a vinyl pyrrolidone or sulfonic acid, into an acrylic resin, a vinyl resin or a cellulose resin or an antistatic resin produced through the copolymerization of such an antistatic group and such a resin. Preferably, the basis weight of the antistatic layer 35 is in the range of 0.001 to 0.1 $g/m^2$. The antistatic layer 35 may be formed by a spraying process or a transfer process instead of a coating process. The thermal transfer recording web 10a provided with the antistatic layer 35 has an excellent antistatic property and is capable of preventing double-sheet feeding.

The inner end part 11 of the rolled thermal transfer recording web 10a has a tab 11a and sticking parts 11b.

Figure 2:
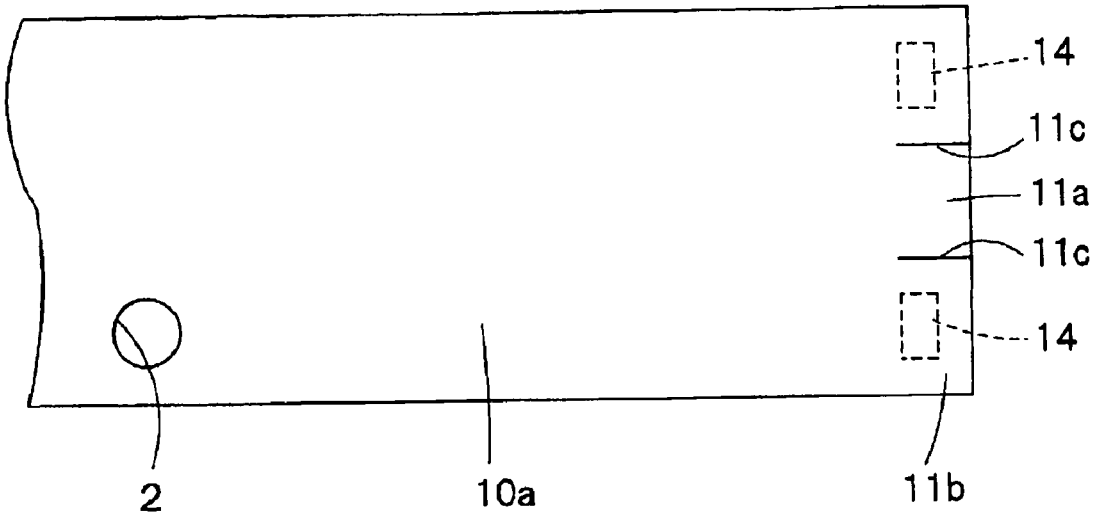
FIG. 2 is a plan view of an inner end part of a thermal transfer recording web unwound from the thermal transfer recording web roll shown in FIG. 1.

FIG. 2 shows the inner end part 11 of the thermal transfer recording web 10a unwound from the thermal transfer recording web roll 10.

A winding machine used in a manufacturing process catches the thermal transfer recording web 10a by the tab 11a in winding the thermal transfer recording web 10a in the thermal transfer recording web roll 10. The inner end part 11 is cut into three parts by slits 11c. The tab 11a is the middle one of those three parts.

The two parts on the opposite sides, with respect to the width, of the tab 11a are the sticking parts 11b. Pseudoadhesive double-coated tapes 14 are attached to the back surfaces (outer surfaces) of the sticking parts 11b. The pseudoadhesive double-coated tapes 14 stick to the innermost layer, i.e., the first layer, of the thermal transfer recording web roll 10 formed by rolling the thermal transfer recording web 10a. The sticking parts 11b provided with the pseudoadhesive double-coated tapes 14 loose their sticking property after the sticking parts 11b have been separated from the inner surface of the innermost layer of the thermal transfer recording web 10a.

The outer end part 12 is fastened temporarily to the thermal transfer recording web 10a with a fastening tape 13 to prevent the thermal transfer recording web roll 10 from coming loose.

Figure 3:
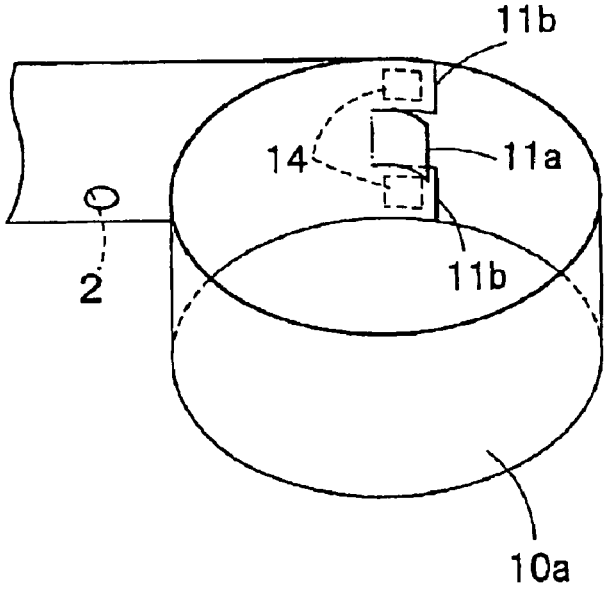
FIG. 3 is a perspective view of an innermost layer of a thermal transfer recording web.

FIG. 3 shows the innermost layer formed by rolling the thermal transfer recording web 10a.

The sticking parts 11b of the inner end part 11 of the thermal transfer recording web 10a stick. Thus, the inner end part 11 is held in place on the innermost layer as shown in FIG. 3 without using any core.

Since the winding machine grips the tab 11a in winding the thermal transfer recording web 10a, the tab ha is curved permanently radially inward as shown in FIGS. 1 and 3. If the inner end part 11 is entirely a sticking part, the inner end part 11 extends radially inward and interferes with a mounting shaft 5a included in a printer 5 in loading the thermal transfer recording web roll 10 into the printer 5, which makes a loading operation difficult and cause faulty loading.

In this embodiment, the tab 11a is at the middle, with respect to the width, of the inner end part 11 of the thermal transfer recording web 10a, and the sticking parts 11b extend in a circular shape conforming to the innermost layer. Therefore, the tab 11a will not obstruct the insertion of the mounting shaft 5a of the printer 5 into the thermal transfer recording web roll 10. Thus, the thermal transfer recording web roll 10 can easily and correctly loaded into the printer 5.

Figure 4:
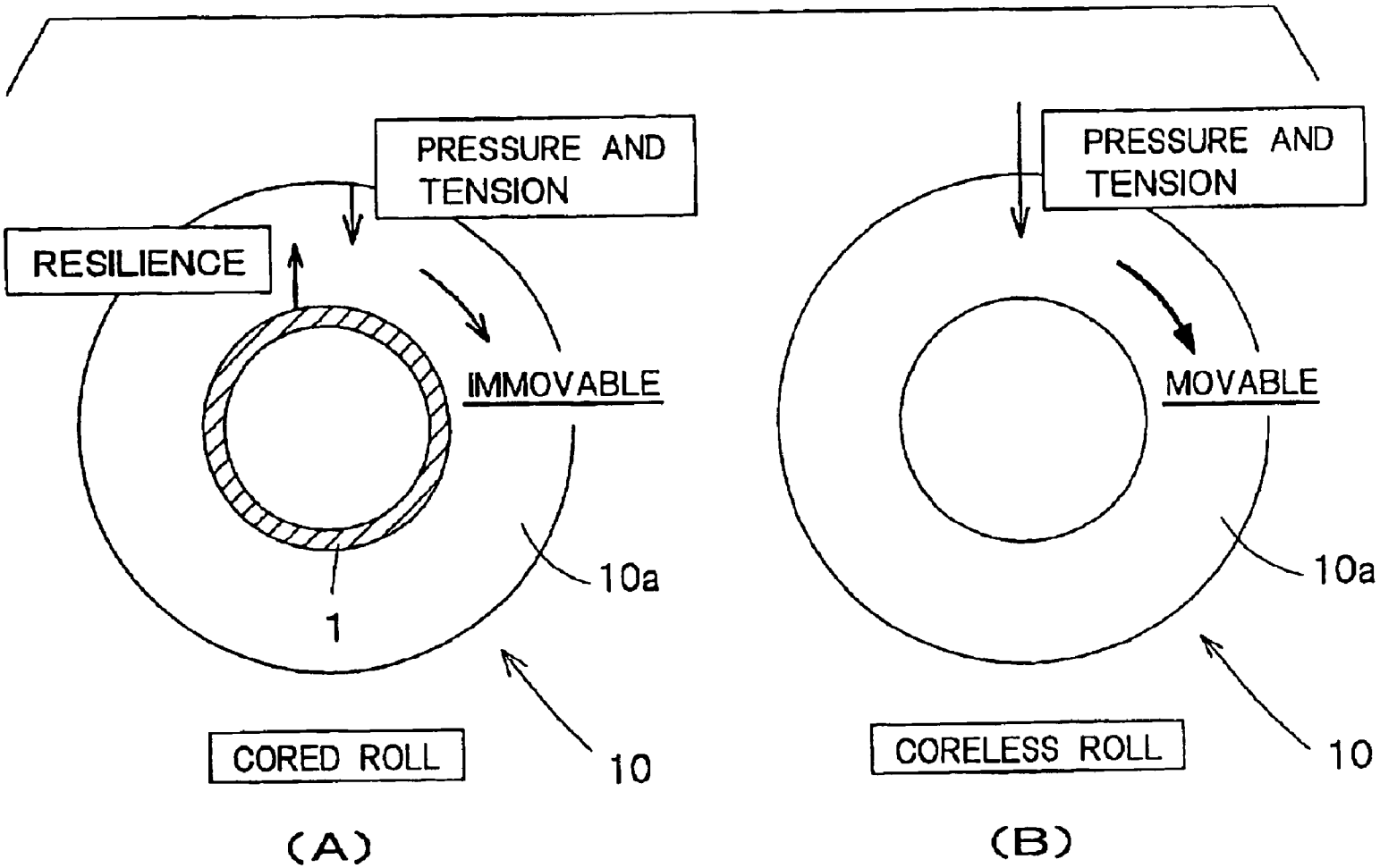
FIG. 4 is a view of assistance in explaining an effect of preventing the deformation of a thermal transfer recording web roll.
Figure 5:
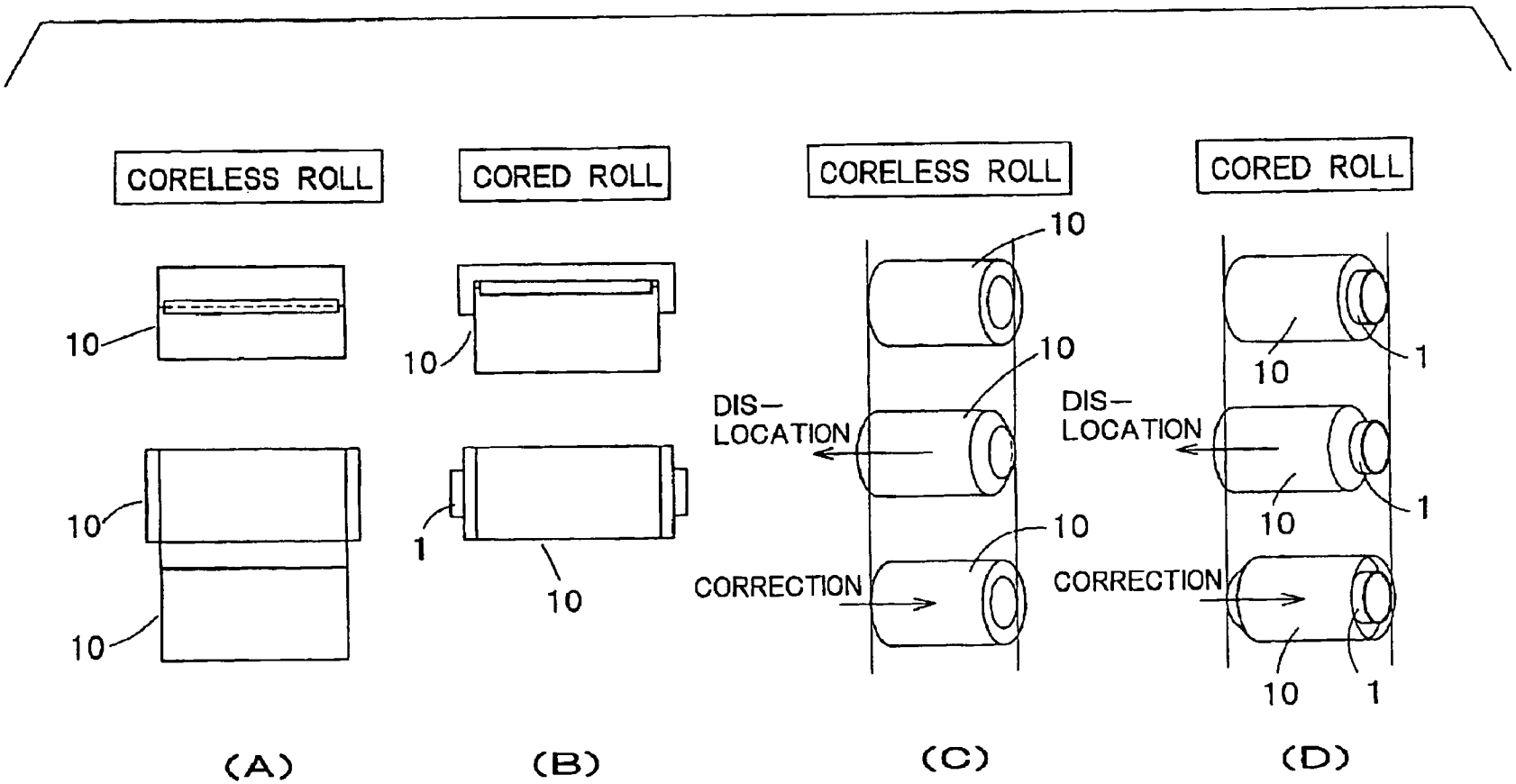
FIG. 5 is a view of assistance in explaining an effect of preventing the deformation of a thermal transfer recording web roll.

FIGS. 4 and 5 are views of assistance in explaining an effect of preventing the deformation of the thermal transfer recording web roll 10.

A thermal transfer recording web roll provided with a core 1 is formed by winding a thermal transfer recording web around the hard cylindrical core 1 under a specified tension and a specified pressure around a hard, cylindrical core 1, and therefore the position of the thermal transfer recording web roll formed on the core cannot be adjusted relative to the core 1. Although the thermal transfer recording web roll 10 in the first embodiment is easily deformable because the thermal transfer recording web roll 10 in the first embodiment, which is a coreless thermal transfer recording web roll, is formed by winding the thermal transfer recording web 10a under low pressure and low tension, the shape of the thermal transfer recording web roll 10 can easily be corrected, there is no problem in the position of the thermal transfer recording web roll 10 relative to a core, and hence the thermal transfer recording web roll 10 is easy to use and handle.

Figure 6:
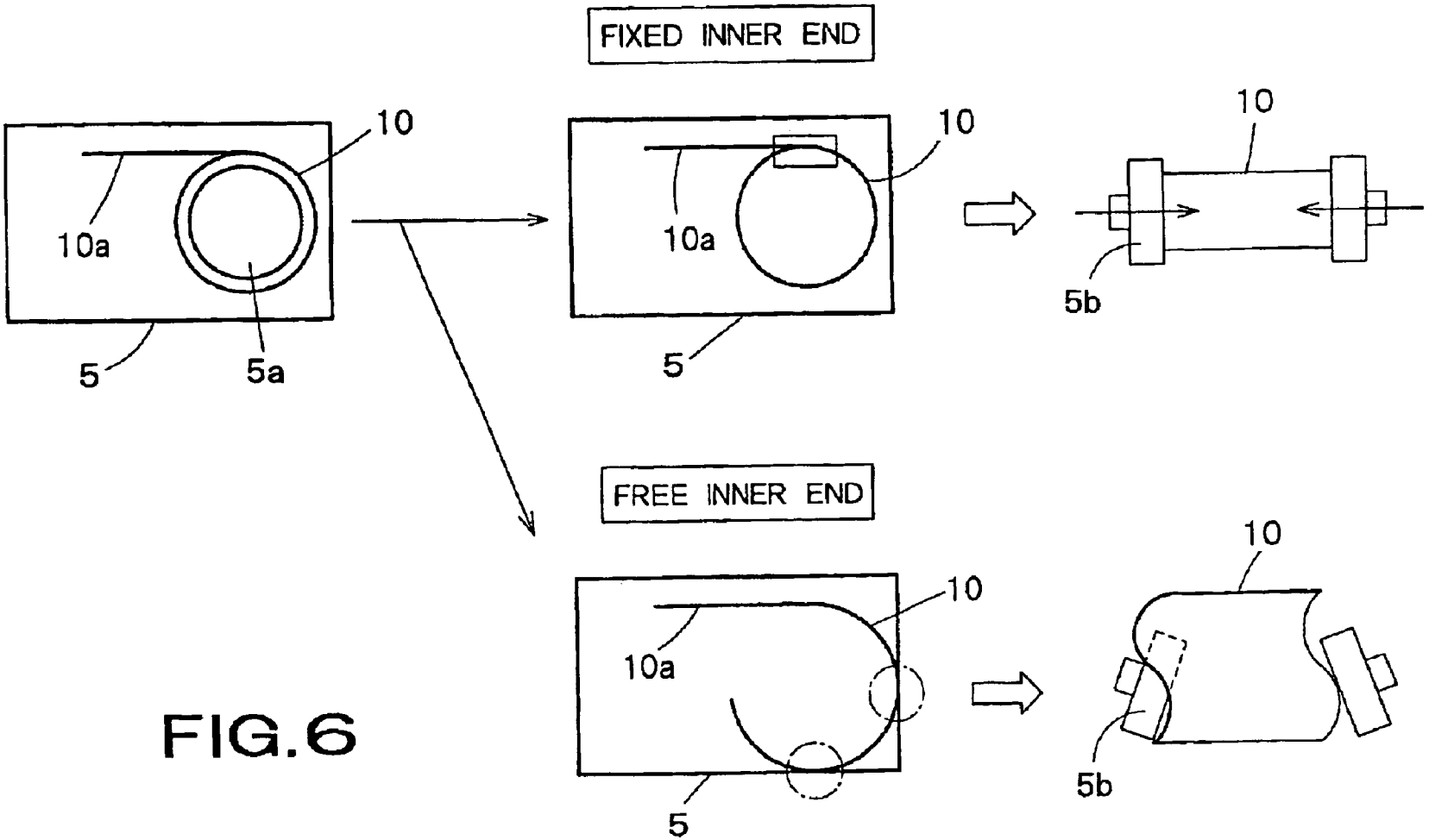
FIG. 6 is a view of assistance in explaining the effect of a sticking part.

FIG. 6 is a view of assistance in explaining the effect of the sticking parts 11b of the thermal transfer recording web 10a.

If the inner end part 11 of the thermal transfer recording web roll 10 is not provided any parts corresponding to the sticking parts 11b and the thermal transfer recording web roll 10 is used on the printer 5, the thermal transfer recording web 10 loosens and the diameter of the thermal transfer recording web roll 10 increases at a stage immediately before the thermal transfer recording web 10 is used up. Consequently, the thermal transfer recording web 10a comes into contact with the inner surfaces of walls of the printer 5 in the vicinity of the thermal transfer recording web roll 10, the thermal transfer recording web 10a is rubbed with the walls and scraps and fragments of the thermal transfer recording web 10a adhere to the inner surfaces of the walls of the printer 5. Dyes cannot be printed on thus flawed or scratched parts of the thermal transfer recording web 10a and on parts of the recording layer 32 covered with the scraps and fragments of the thermal transfer recording web 10a scattered in the printer 5, and the printing ribbon cannot normally be separated form those parts of the thermal transfer recording web 10a.

If the inner end part 11 of the thermal transfer recording web roll 10 is not provided any parts corresponding to the sticking parts 11b, the thermal transfer recording web 10a needs to be wound in several turns to hold the thermal transfer recording web roll 10 in its shape. When flanges 5b included in the printer 5 are pressed against the opposite ends of the thermal transfer recording web roll 10 to hold the thermal transfer recording web roll 10 in place, the thermal transfer recording web roll 10 cannot be held when the thermal transfer recording web 10a is wound in one layer.

Since the inner end part 11 of the thermal transfer recording web roll 10 in this embodiment is provided with the sticking parts 11b, the flanges 5b of the printer 5 are able to hold the thermal transfer recording web roll 10 between the flanges 5b even if the thermal transfer recording web roll 10 has only one layer.

Although the pseudoadhesive double-coated tapes 14 are attached to the sticking parts 11b in this embodiment, an optimum method of attaching the sticking parts 11b to the inner surface of the innermost layer must selectively be determined taking into consideration an end detecting method by which the printer detects the end of the thermal transfer recording web 10a of the thermal transfer recording web roll 10.

Figure 7:
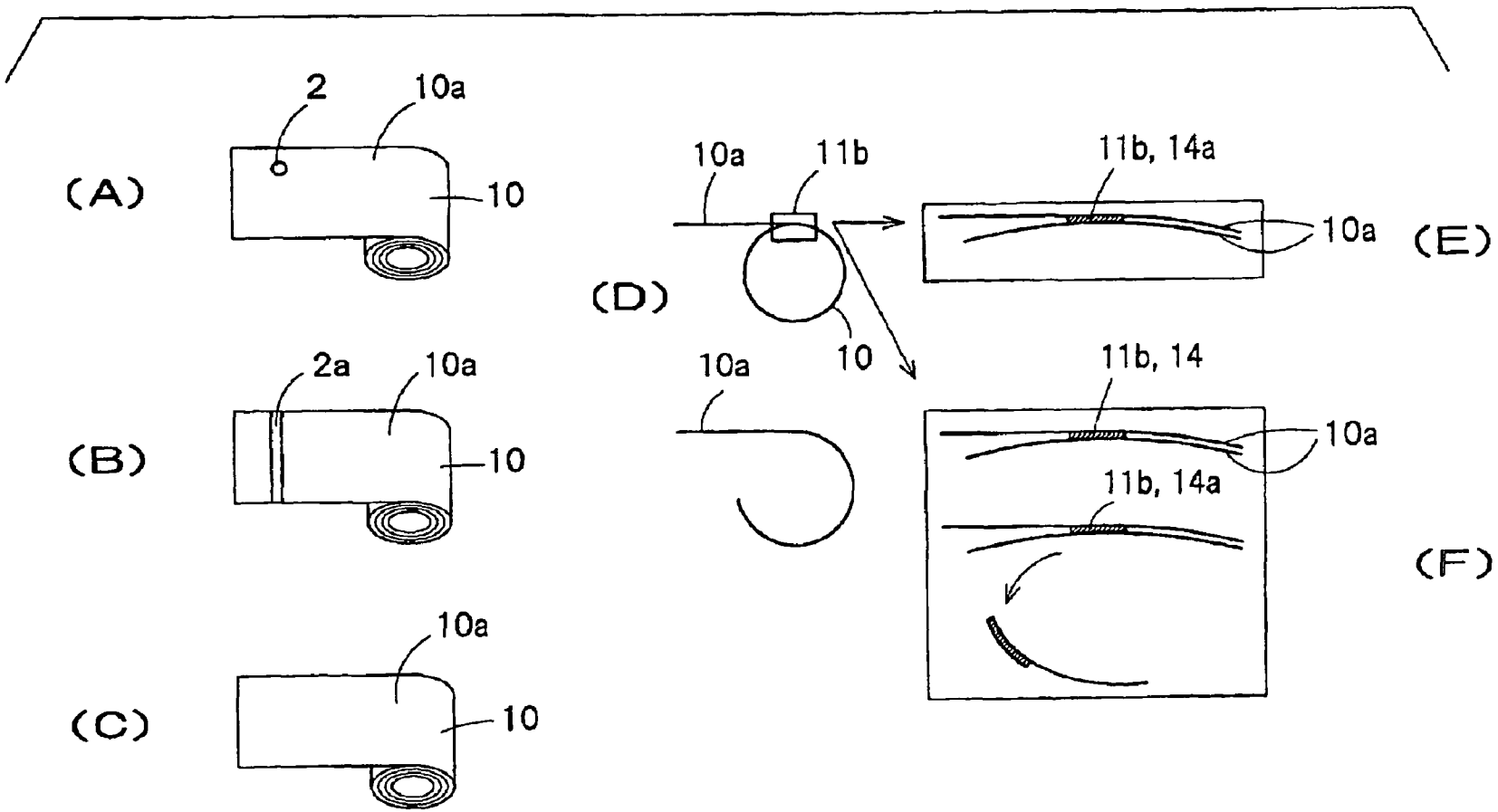
FIG. 7 is a view of assistance in explaining the relation between an end detecting method of detecting an end part to be carried out by a printer, and an inner end part attaching method.

FIG. 7 is a view of assistance in explaining the relation between an end detecting method of detecting an end part to be carried out by the printer, and an attaching method of attaching the inner end part of the thermal transfer recording web 10a to the innermost layer of the thermal transfer recording web roll 10.

When the printer 5 is provided with a sensor that detects light passed through an end indicating hole 2 formed in the thermal transfer recording web 10a or light reflected from an end indicating mark 2a marked on the thermal transfer recording web 10a of the thermal transfer recording web roll 10, a thermal transfer recording web feed mechanism included in the printer 5 stops when the sensor detects the light passed through the end indicating hole 2 or the light reflected from the end indicating mark 2a. Therefore, the sticking parts 11b may be of any shape provided that the sticking parts 11b are attached to the innermost layer (FIGS. 7(A) and 7(B)).

When the thermal transfer recording web 10a of the thermal transfer recording web roll 10 is provided with neither any hole corresponding to the end indicating hole 2 nor any mark corresponding to the end indicating mark 2a, and the printer 5 detects a change in the torque acting on the thermal transfer recording web feed mechanism, the shape of the sticking parts 11b must selectively be determined so that the printer 5 is able to detect the change in the torque (FIGS. 7(C) and 7(D)).

When the approach of the end is indicated by the duration of a maximum take-up torque for a predetermined time, the sticking parts 11b may be attached to the innermost layer with adhesive means capable of sticking to the innermost layer, such as adhesive double-coated tapes 14a, adhesive tapes or an adhesive (FIG. 7(E)). The adhesive strength bonding the sticking parts 11b to the innermost layer must withstand the peeling effect of a take-up torque applied to the thermal transfer recording web roll 10 by the printer 5.

When the approach of the end is indicated by the reduction of the take-up torque to naught, the printer stops upon the separation of the sticking parts 11b from the innermost layer. Therefore, the sticking surfaces of the sticking parts 11b must become tack-free (nonadhesive) after the sticking parts 11b have been separated from the innermost layer. The bond strength between the sticking parts 11b and the innermost layer should not be excessively high, and the sticking parts 11b must be separated from the innermost layer when a torque not higher than the take-up torque and not lower than a predetermined level acts on the thermal transfer recording web roll 10. Therefore, it is preferable to use the pseudoadhesive double-coated tapes 14 (FIG. 7(F)).

The thermal transfer recording web 10a of the thermal transfer recording web roll 10 in this embodiment is provided with the end indicating hole 2 as shown in FIG. 3 and is intended to be used on a printer 5 that detects the end indicating hole. However, since the sticking parts 11b are attached to the innermost layer with the pseudoadhesive double-coated tapes 14, the thermal transfer recording web roll 10 can be used on a printer 5 that detects neither an end indicating hole nor an end indicating mark and decides that the thermal transfer recording web 10a is substantially used up when the take-up torque decreases to a naught.

The pseudoadhesive double-coated tape 14 will be explained.

The pseudoadhesive double-coated tape 14 has either of the following two forms.

(1) Release tape/Adhesive layer/Nonwoven or paper tape/Resin layer/Plastic base/Adhesive layer/Release tape (2) Release tape/Adhesive layer/Plastic base/Resin layer/Plastic base/Adhesive layer/Release tape In forming the pseudoadhesive double-coated tape of the form (1), a molten resin is extruded through a T-die or the like on a nonwoven tape (or a plastic base) to form a resin layer, and the nonwoven tape (or the plastic base) is laminated to a plastic base (or a nonwoven tape), an adhesive layer is formed on the surface of the nonwoven tape (or the plastic base), an adhesive layer is formed on the surface of the plastic base (or the nonwoven tape), and then release tapes are applied to the adhesive layers.

Suitable resins for forming the resin layer include polypropylene resin, such as Novatec-P available from Mitsubishi Kagaku, polyolefin resins, such as TPX (polymethylpentene) available from Mitsui Kagaku, polyamide resins, ionomers and nylons.

Since the thermal transfer recording web roll 10 in the first embodiment is a coreless roll, the thermal transfer recording web can be rolled without using any core and much time and labor at a low cost, and pictures of satisfactory picture quality can be printed by thermal transfer printing on the thermal transfer recording web.

Second Embodiment

Figure 8:
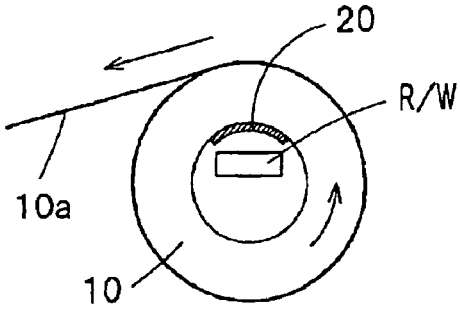
FIG. 8 is an end view of a thermal transfer recording web roll in a second embodiment according to the present invention.

FIG. 8 shows a thermal transfer recording web roll 10 in a second embodiment according to the present invention.

The thermal transfer recording web roll 10 in the second embodiment is the same in construction as the thermal transfer recording web roll 10 in the first embodiment, except that the former is provided with a radio frequency identification tag 20 near an inner end part 11 of the thermal transfer recording web 10a.

The radio frequency identification tag 20 is an on contact IC tag (RFID) attached to a part near the inner end part 11 of the inner surfaces of the thermal transfer recording web roll 10. Information about the type, size and such of the thermal transfer recording web roll 10 is recorded on the noncontact IC tag. When the thermal transfer recording web roll 10 is loaded into a printer 5, a read-write head R/W reads the information held by the noncontact IC tag.

Since the radio frequency identification tag 20 is attached to the thermal transfer recording web roll 10, the coreless thermal transfer recording web roll 10 is able to hold necessary information and the printer is able to use the information.

Modifications

The present invention is not limited in its practical application to the foregoing embodiments, various modifications of the foregoing embodiments may be made and various changes are possible in the foregoing embodiments without departing from the scope of the present invention.

Figure 9:
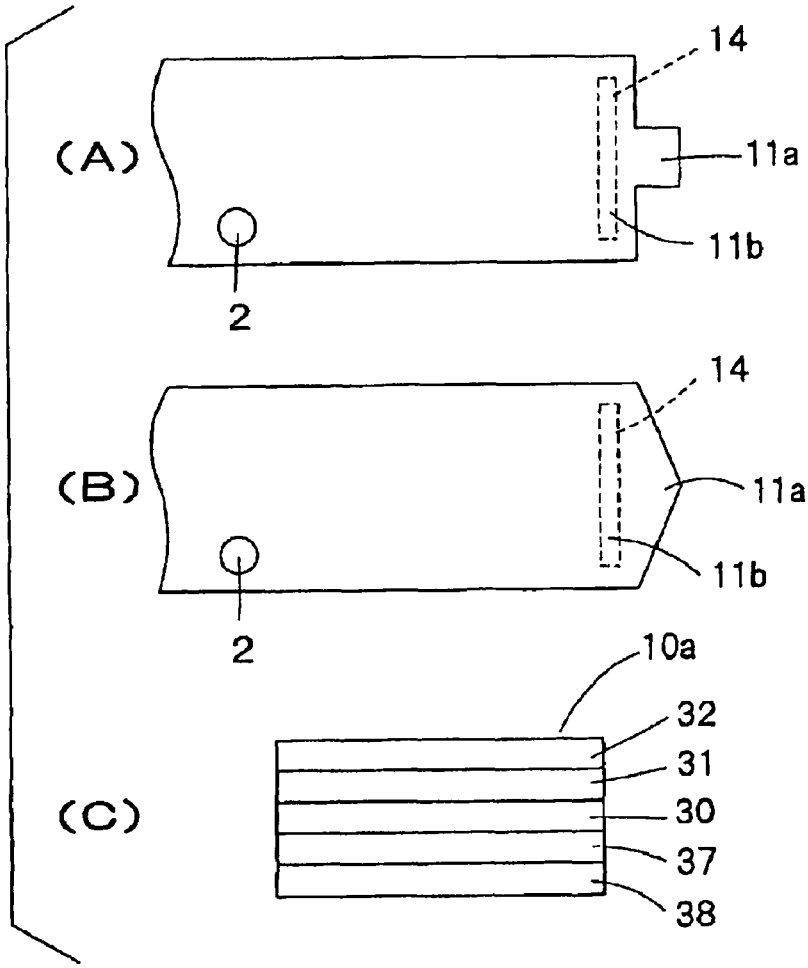
FIG. 9 is a view of thermal transfer recording webs in modifications.
Figure 10:
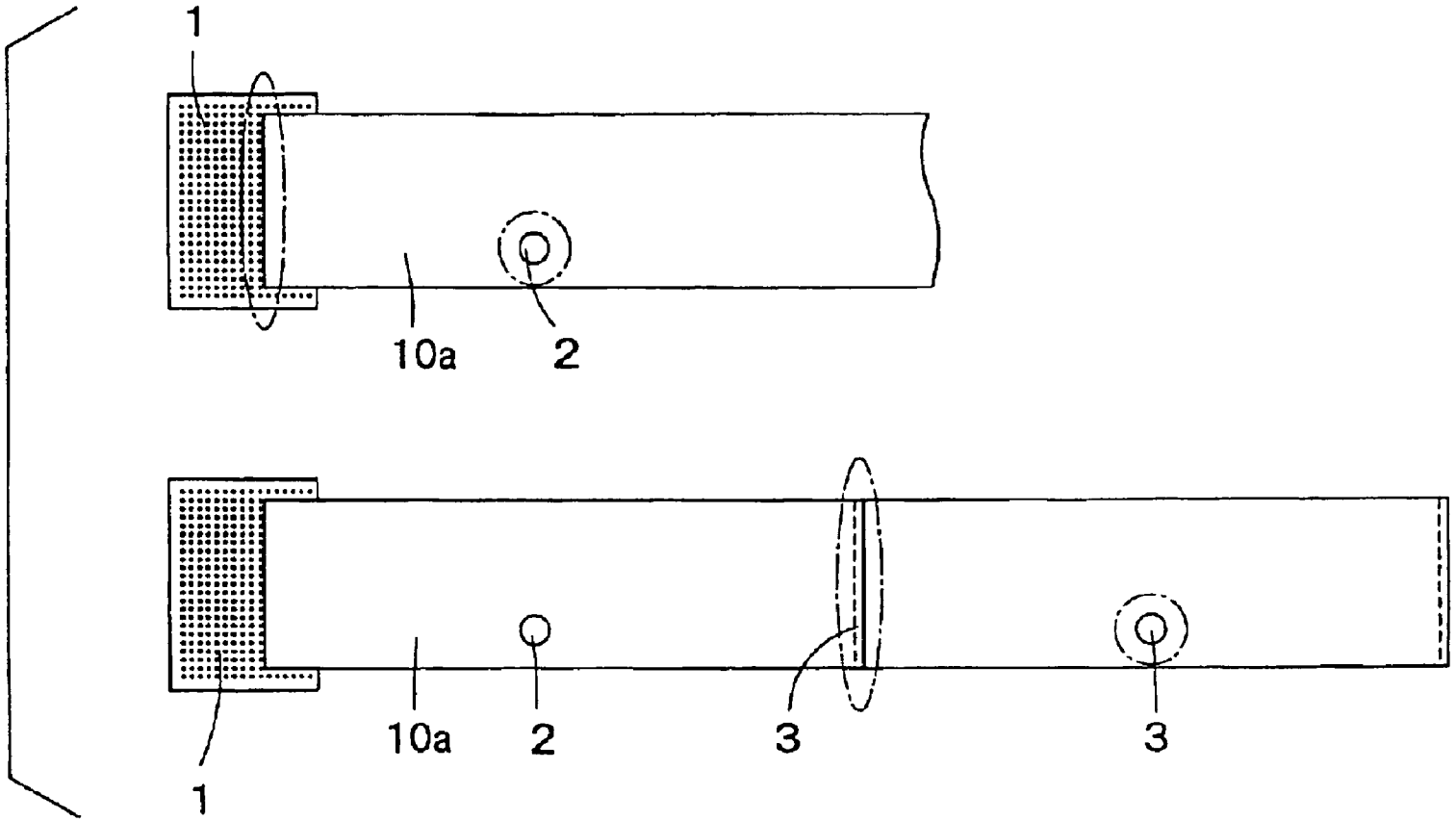
FIG. 10 is a view showing flaws formed in an inner end part of a thermal transfer recording web forming a conventional thermal transfer recording web roll.

For example, although the tab 11a and the sticking parts 11b are arranged along the width of the thermal transfer recording web 10a in the foregoing embodiments, the tab 11a may be formed in a middle part with respect to the width of the thermal transfer recording web 10a so as to protrude in the winding direction, and a sticking part 11b may be formed in the inner end part as shown in FIGS. 9(A) and 9(B). In FIGS. 9(A) and 9(B), the sticking part 11b and a pseudoadhesive double-coated tape 14 are indicated by broken lines.

An adhesive layer 37 may be formed on a surface of the base web 30, opposite to the recording layer 31 of the thermal transfer recording web 10a of the thermal transfer recording web roll 10 in the first embodiment, and a release tape 38 may be applied to the adhesive layer 37 to use the thermal transfer recording web 10a as a photograph sealing web.

As apparent form the foregoing description, the present invention has the following effects.

(1) The thermal transfer recording web roll 10 can be produced at a low cost because the thermal transfer recording web roll 10 is formed by rolling the thermal transfer recording web 10a in a substantially cylindrical shape without using any core.

Since the thermal transfer recording web roll 10 is not provided with any core, the thermal transfer recording web roll 10 does not produce unnecessary waste.

The deformation of the thermal transfer recording web roll 10 can easily be corrected and handling of the thermal transfer recording web roll 10 is facilitated.

Any flaws corresponding to steps including an end detection hole formed in the thermal transfer recording web are not formed in the thermal transfer recording web and pictures can be formed in satisfactory picture quality on the thermal transfer recording web.

(2) Since the thermal transfer recording web 10a is provided with the sticking parts 11b at parts of the inner end part 11 that is in contact with the inner surface of the innermost layer of the thermal transfer recording web 10a, the thermal transfer recording web roll 10 will not loosen immediately before the thermal transfer recording web 10a of the thermal transfer recording web roll 10 is used up and thereby troubles that may result from the loosening of the thermal transfer recording web roll 10 can be avoided.

(3) Since the sticking surfaces of the sticking parts 11b become tack-free after the sticking parts 11b have been separated from the innermost layer, the thermal transfer recording web roll 10 can be used on a printer that detects the end of the thermal transfer recording web 10a by any detecting method.

(4) The pseudoadhesive sticking parts become tack-free surely and simply after the same have been separated from the innermost layer.

(5) since the tab 11a is at the middle of the inner end part 11 of the thermal transfer recording web 10a, the tab 11a will not obstruct the loading operation for loading the thermal transfer web roll 10 into the printer 5 and the thermal transfer recording web roll 10 can easily and correctly loaded into the printer 5.

(6) Since the inner end part 11 of the thermal transfer recording web 10a is provided with the slits 11c demarcating the tab 11a and the adjacent sticking parts 11b, any scraps and fragments are not produced in manufacturing the thermal transfer recording web roll 10.

(7) When the tab 11a projects in the winding direction, the thermal transfer recording web 10a can easily be attached to the winding machine.

(8) When the adhesive layer 37 is formed on the surface, opposite the surface on which the recording layer 32 is formed, of the base web 30, and the release tape 38 is attached to the adhesive layer 37, a coreless thermal transfer recording web roll for use on a photograph sealing printing machine can be formed, and even an unskilled operator is able to handle the coreless thermal transfer recording web roll easily.

(9) When the thermal transfer recording web roll 10 is provided with the noncontact IC tag 20 in a part of the thermal transfer recording web 10a near the inner end part 11, the coreless thermal transfer recording web roll 10 is able to hold various pieces of information.

What is claimed is:

1. A thermal transfer recording web roll for use on a printer, formed by winding a thermal transfer recording web having a base web, and a recording layer formed on one of the surfaces of the base web; wherein the thermal transfer recording web is wound in a substantially cylindrical shape, a sticking part sticking to an innermost layer of the thermal transfer recording web is formed in an inner end part of the thermal transfer recording web, and the outer surface of the inner end part of the thermal transfer recording web is held by the inner surface of the innermost layer of the thermal transfer recording web through the sticking part, wherein the inner end part of the thermal transfer recording web is provided with a tab for winding.

2. The thermal transfer recording web roll for a printer according to claim 1, wherein the sticking part becomes tack-free after the outer surface of the inner end part of the thermal transfer recording web is separated from the inner surface, of the innermost layer of the thermal transfer recording web.

3. The thermal transfer recording web roll for a printer according to claim 1, wherein the sticking part has a pseudoadhesive property that enables the sticking part to be separated from the innermost layer of the thermal transfer recording web by a peeling force not higher than a peeling force corresponding to a take-up torque exerted by the printer.

4. The thermal transfer recording web roll for use on a printer according to claim 3, wherein the sticking part includes a pseudoadhesive [a] double-coated tape.

5. The thermal transfer recording web roll for use on a printer according to claim 1, wherein the inner end part of the thermal transfer recording web has the tab formed in a middle part thereof with respect to the width, and a pair of sticking parts respectively on the [Opposite] *opposite* sides of the tab.

6. The thermal transfer recording web roll for use on a printer according to claim 5, wherein the tab and the sticking parts[,] are demarcated by slits, respectively.

7. The thermal transfer recording web roll for use on a printer according to claim 1, wherein the tab projects in a winding direction of the thermal transfer recording web relative to the sticking part.

8. The thermal transfer recording web roll for use on a printer according to claim 7, wherein the tab has a rectangular projection projecting from a middle part of the inner end of the thermal transfer recording web.

9. The thermal transfer recording web roll for use on a printer according to claim 7, wherein the tab has a triangular projection projecting from a middle part of the inner end of the thermal transfer recording web.

10. The thermal transfer recording web roll for use on a printer according to claim 1, wherein an adhesive layer is formed on the other surface of the base web, and a release tape is applied to the adhesive layer.

11. The thermal transfer recording web roll for use on a printer according to claim 1, wherein a noncontact IC tag is attached to a part of the thermal transfer recording web near the inner end part of the thermal transfer recording web.

12. The thermal transfer recording web roll for use on a printer according to claim 1, wherein adhesive strength of the sticking part between the innermost layer of the thermal transfer recording web and the inner end part of the thermal transfer recording web is higher than a peeling force corresponding to a take-up torque exerted by the printer.

*13. A thermal transfer recording web roll for use on a printer, formed by winding a thermal transfer recording web having a base web, and a recording layer formed on one of the surfaces of the base web; wherein*

*the thermal transfer recording web is wound in a substantially cylindrical shape,*

*a sticking part sticking to an innermost layer of the thermal transfer recording web is formed in an inner end part of the thermal transfer recording web,*

*the outer surface of the inner end part of the thermal transfer recording web is held by the inner surface of the innermost layer of the thermal transfer recording web through the sticking part, and*

*an end indicating hole or an end indicating mark is formed at an upstream part of the sticking portion of the innermost layer for indicating the inner end part of the thermal transfer recording web.*

*14. The thermal transfer recording web roll for use on a printer according to claim 13, wherein*

*the sticking part becomes tack-free after the outer surface of the inner end part of the thermal transfer recording web is separated from the inner surface of the innermost layer of the thermal transfer recording web.*

*15. The thermal transfer recording web roll for use on a printer according to claim 13, wherein*

*the sticking part has a pseudoadhesive property that enables the sticking part to be separated from the innermost layer of the thermal transfer recording web by a peeling force not higher than a peeling force corresponding to take-up torque exerted by the printer.*

*16. The thermal transfer recording web roll for use on a printer according to claim 15, wherein*

*the sticking part includes pseudoadhesive double-coated tape.*

*17. The thermal transfer recording web roll for use on a printer according to claim 13, wherein*

*the inner end part of the thermal transfer recording web is provided with a tab for winding.*

*18. The thermal transfer recording web roll for use on a printer according to claim 17, wherein*

*the inner end part of the thermal transfer recording web has the tab formed in a middle part thereof with respect to the width, and further comprising a pair of sticking parts respectively on the opposite sides of the tab.*

*19. The thermal transfer recording web roll for use on a printer according to claim 18, wherein*

*the tab and the sticking parts are demarcated by slits, respectively.*

*20. The thermal transfer recording web roll for use on a printer according to claim 17, wherein*

*the tab projects in a winding direction of the thermal transfer recording web relative to the sticking part.*

*21. The thermal transfer recording web roll for use on a printer according to claim 20, wherein*

*the tab has a rectangular projection projecting from a middle part of the inner end of the thermal transfer recording web.*

*22. The thermal transfer recording web roll for use on a printer according to claim 20, wherein*

*the tab has a triangular projection projecting from a middle part of the inner end of the thermal transfer recording web.*

*23. The thermal transfer recording web roll for use on a printer according to claim 13, wherein*

*an adhesive layer is formed on the other surface of the base web, and a release tape is applied to the adhesive layer.*

*24. The thermal transfer recording web roll for use on a printer according to claim 13, wherein*

*a noncontact IC tag is attached to a part of the thermal transfer recording web near the inner end part of the thermal transfer recording web.*

*25. The thermal transfer recording web roll for use on a printer according to claim 13, wherein*

*adhesive strength of the sticking part between the innermost layer of the thermal transfer recording web and the inner end part of the thermal transfer recording web is higher than a peeling force corresponding to a take-up torque exerted by the printer.*

* * * * *